United States Patent
Li et al.

(10) Patent No.: US 12,033,409 B2
(45) Date of Patent: Jul. 9, 2024

(54) CHARACTER OFFSET DETECTION METHOD AND SYSTEM

(71) Applicant: NANJING UNIVERSITY OF SCIENCE AND TECHNOLOGY, Jiangsu (CN)

(72) Inventors: Zechao Li, Jiangsu (CN); Jinhui Tang, Jiangsu (CN); Huang Li, Jiangsu (CN)

(73) Assignee: NANJING UNIVERSITY OF SCIENCE AND TECHNOLOGY (CN)

( * ) Notice: Subject to any disclaimer, the term of this patent is extended or adjusted under 35 U.S.C. 154(b) by 474 days.

(21) Appl. No.: 17/414,551

(22) PCT Filed: May 28, 2020

(86) PCT No.: PCT/CN2020/092826
§ 371 (c)(1),
(2) Date: Jun. 16, 2021

(87) PCT Pub. No.: WO2021/232464
PCT Pub. Date: Nov. 25, 2021

(65) Prior Publication Data
US 2023/0360418 A1 Nov. 9, 2023

(30) Foreign Application Priority Data
May 20, 2020 (CN) .......................... 202010431910.0

(51) Int. Cl.
*G06V 30/146* (2022.01)
*G06V 20/62* (2022.01)
(Continued)

(52) U.S. Cl.
CPC .......... *G06V 30/1463* (2022.01); *G06V 20/62* (2022.01); *G06V 30/153* (2022.01); *G06V 30/1801* (2022.01)

(58) Field of Classification Search
CPC ...... G06V 30/10; G06V 30/153; G06V 10/44; G06V 30/414; G06V 30/1478; G06V 30/1463; G06V 30/1801; G06V 20/62
See application file for complete search history.

(56) References Cited

U.S. PATENT DOCUMENTS

| 5,956,409 | A | * | 9/1999 | Chan ................. H04N 1/32101 380/54 |
| 6,067,374 | A | * | 5/2000 | Fan ....................... G07D 7/206 382/209 |

(Continued)

FOREIGN PATENT DOCUMENTS

| CN | 108491870 A | * | 9/2018 | ............. G06K 9/342 |
| CN | 110765992 A | * | 2/2020 | ........... G06K 9/2054 |

(Continued)

*Primary Examiner* — Dung Hong
(74) *Attorney, Agent, or Firm* — Onello & Mello, LLP

(57) ABSTRACT

The present disclosure discloses a character offset detection method and system. The method includes: acquiring a text image; performing character separation based on the text image to obtain a character text region; calculating a center point of each rectangular box in the character text region to obtain a center point set; determining an optimal fitted curve based on the center point set; and analyzing character offset based on the optimal fitted curve to obtain an offset result. The present disclosure realizes detection of the character offset based on curve fitting, so that the accuracy of detection is improved.

11 Claims, 2 Drawing Sheets

(51) Int. Cl.
*G06V 30/148* (2022.01)
*G06V 30/18* (2022.01)

(56) References Cited

U.S. PATENT DOCUMENTS

| | | | | |
|---|---|---|---|---|
| 2006/0265743 | A1* | 11/2006 | Kusunoki | H04N 1/00867 |
| | | | | 726/21 |
| 2008/0092231 | A1* | 4/2008 | Awata | G06F 21/84 |
| | | | | 726/19 |
| 2009/0141952 | A1* | 6/2009 | Saito | G06F 21/32 |
| | | | | 382/124 |
| 2011/0006977 | A1* | 1/2011 | Khosravy | G06T 11/60 |
| | | | | 345/156 |
| 2016/0042262 | A1* | 2/2016 | Tanaka | G06V 10/245 |
| | | | | 235/494 |
| 2016/0162733 | A1* | 6/2016 | Rouh | G06V 30/416 |
| | | | | 382/103 |
| 2019/0156540 | A1* | 5/2019 | Hiramoto | G09B 29/10 |

FOREIGN PATENT DOCUMENTS

| | | | | | |
|---|---|---|---|---|---|
| CN | 110826314 | A | * | 2/2020 | ....... G06F 16/90344 |
| JP | 2000148742 | A | * | 5/2000 | ............. G06F 21/64 |

* cited by examiner

CHARACTER OFFSET DETECTION METHOD AND SYSTEM

TECHNICAL FIELD

The present disclosure relates to the technical field of computer visions, and in particular, a character offset detection method and system.

BACKGROUND ART

Text is an important carrier of human information and an indispensable part of human life. It exists widely in various life scenarios. In recent years, with the development of digital media technologies, pictures of various scenarios have become main carriers for information exchange. At the same time, needs for image analysis based on text information in an image is becoming more and more extensive.

For all kinds of text image researches, existing detection methods mainly lie in analysis and research of text lines. Text detection of various scenarios basically stops at text entries. A main task is to locate a text line, but characters are not analyzed. At present, character analysis is also extremely important. Especially in various forms, the content of a seal or rubbing will have a great impact on the entire form information. There is consistency in text distributions in a seal image region of a form, including font size consistency and location distribution consistency. Analyzing characters in this region can provide an effective reference for authenticating such images, but there is no specific technical solution disclosed of how to analyze character offset at present.

SUMMARY

Based on this, the present disclosure is directed to provide a character offset detection method and system to realize detection of character offset.

In order to achieve the above purpose, the present disclosure provides a character offset detection method. The method includes:

Step S1: acquiring a text image;
Step S2: performing character separation based on the text image to obtain a character text region;
Step S3: calculating a center point of each rectangular box in the character text region to obtain a center point set;
Step S4: determining an optimal fitted curve based on the center point set; and
Step S5: analyzing character offset based on the optimal fitted curve to obtain an offset result.

Optionally, the step of determining an optimal fitted curve based on the center point set specifically includes:

Step S41: selecting a start point, an end point and a certain intermediate point from the center point set;
Step S42: connecting the start point to the end point to obtain a first straight line, and connecting the start point to the certain intermediate point to obtain a second straight line;
Step S43: determining an included angle cosine between the first straight line and the second straight line;
Step S44: searching an optimal fitted curve based on the included angle cosine.

Optionally, the step of searching an optimal fitted curve based on the included angle cosine specifically includes:

Step S441: determining whether the included angle cosine is greater than an angle threshold; indicating that the position of a certain character has deviated relative to the whole text region if the included angle cosine is greater than the angle threshold, and performing "step S442"; and taking an initial fitted curve as the optimal fitted curve if the included angle cosine is less than or equal to the angle threshold;

Step S442: acquiring the initial fitted curve;
Step S443: determining a loss function value based on the initial fitted curve; and
Step S444: determining whether the loss function value is less than a set value; taking the initial fitted curve as the optimal fitted curve if the loss function value is less than the set value; and updating the slope and the offset amount in the initial fitted curve if the loss function value is greater than or equal to the set value, taking the updated fitted curve as the initial fitted curve, and performing "step S443".

Optionally, the step of analyzing character offset based on the optimal fitted curve to obtain an offset result specifically includes:

Step S51: performing character vertical-offset analysis based on the optimal fitted curve;
Step S52: performing character horizontal-offset analysis based on the optimal fitted curve; and
Step S53: performing character size offset analysis based on the optimal fitted curve.

Optionally, the step of performing character vertical-offset analysis based on the optimal fitted curve specifically includes:

Step S511: calculating a distance from each center point in the center point set to the optimal fitted curve to obtain a first distance;
Step S522: calculating a ratio of the first distance to the height of the rectangular box to obtain a first result; and
Step S533: indicating that a character corresponding to the center point has deviated from the optimal fitted curve in a vertical direction if the first result is greater than a second set threshold.

Optionally, the step of performing character horizontal-offset analysis based on the optimal fitted curve specifically includes:

Step S521: respectively making a vertical line from each center point in the center point set to the optimal fitted curve to obtain a plurality of projection points;
Step S522: determining a distance between the start projection point and the end projection point to obtain a second distance;
Step S523: determining a predicted distance between two adjacent projection points according to the second distance;
Step S524: determining an actual distance between two adjacent projection points; and
Step S525: calculating a ratio of the actual distance to the predicted distance to obtain a second result, wherein the more the second result deviates from 1, the greater the offset probability of the character corresponding to the center point from the optimal fitted curve in the horizontal direction is.

Optionally, the step of performing character size offset analysis based on the optimal fitted curve specifically includes:

Step S531: calculating an area of each rectangular box in the character text region, and selecting a maximum area and a minimum area; and
Step S532: proportioning the maximum area to the minimum area to obtain a third result; indicating that a style difference in character size exists if the third result is greater than or equal to 1.5; and indicating that no style difference in character size exists if the third result is less than 1.5.

The present disclosure further provides a character offset detection system. The system includes:

an acquisition module, configured to acquire a text image;

a character text region determination module, configured to perform character separation based on the text image to obtain a character text region;

a center point set determination module, configured to calculate a center point of each rectangular box in the character text region to obtain a center point set;

an optimal fitted curve determination module, configured to determine an optimal fitted curve based on the center point set; and an offset result determination module, configured to analyze character offset based on the optimal fitted curve to obtain an offset result.

Optionally, the optimal fitted curve determination module specifically includes:

a selection unit, configured to select a start point, an end point and a certain intermediate point from the center point set;

a straight line determination unit, configured to connect the start point to the end point to obtain a first straight line, and connect the start point to the certain intermediate point to obtain a second straight line;

an included angle cosine determination unit, configured to determine an included angle cosine between the first straight line and the second straight line; and an optimal fitted curve determination unit, configured to search an optimal fitted curve based on the included angle cosine.

Optionally, the optimal fitted curve determination unit specifically includes:

a first determining sub-unit, configured to determine whether the included angle cosine is greater than an angle threshold; indicate that the position of a certain character has deviated relative to the whole text region if the included angle cosine is greater than the angle threshold, and perform an "acquisition sub-unit"; and take an initial fitted curve as the optimal fitted curve if the included angle cosine is less than or equal to the angle threshold;

an acquisition sub-unit, configured to acquire the initial fitted curve;

a loss function value determination sub-unit, configured to determine a loss function value based on the initial fitted curve; and a second determining sub-unit, configured to determine whether the loss function value is less than a set value; take the initial fitted curve as the optimal fitted curve if the loss function value is less than the set value; and update the slope and the offset amount in the initial fitted curve if the loss function value is greater than or equal to the set value, take the updated fitted curve as the initial fitted curve, and perform the "loss function value determination sub-unit".

According to the specific embodiments provided by the present disclosure, the present disclosure discloses the following technical effects that:

the present disclosure discloses a character offset detection method and system, the method including: acquiring a text image; performing character separation based on the text image to obtain a character text region; calculating a center point of each rectangular box in the character text region to obtain a center point set; determining an optimal fitted curve based on the center point set; and analyzing character offset based on the optimal fitted curve to obtain an offset result. The present disclosure realizes detection of the character offset based on curve fitting, so that the accuracy of detection is improved.

BRIEF DESCRIPTION OF THE DRAWINGS

In order to describe the embodiments of the present disclosure or technical solutions in the existing art more clearly, drawings required to be used in the embodiments will be briefly introduced below. Apparently, the drawings in the descriptions below are only some embodiments of the present disclosure. Those ordinarily skilled in the art also can acquire other drawings according to these drawings without creative work.

DETAILED DESCRIPTION

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present disclosure, all other embodiments obtained by those ordinarily skilled in the art without creative work shall fall within the protection scope of the present disclosure.

The present disclosure is directed to provide a character offset detection method and system to realize detection of character offset.

In order to make the above-mentioned purposes, characteristics and advantages of the present disclosure more obvious and understandable, the present disclosure is further described in detail below with reference to the accompanying drawings and specific implementation modes.

Figure 1:
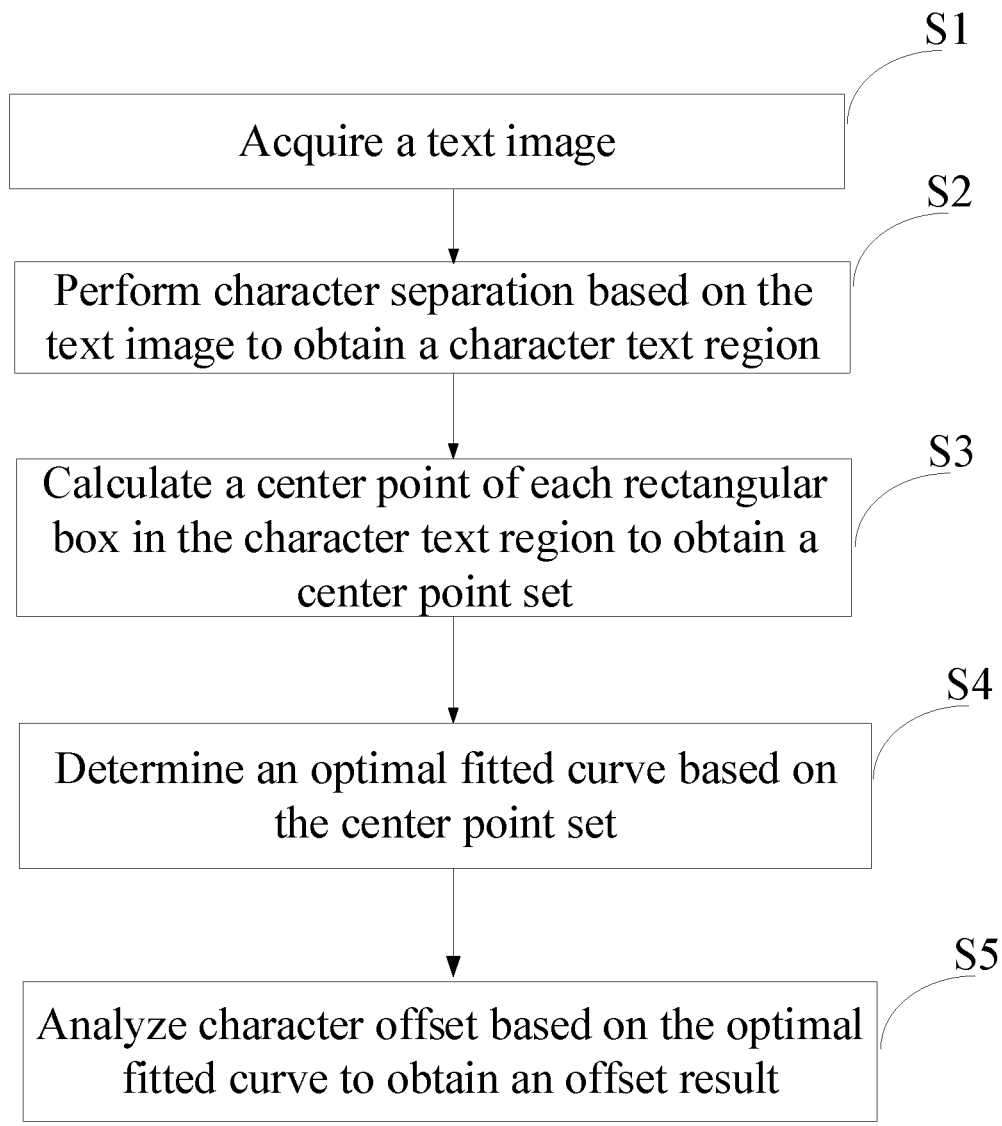
FIG. 1 is a flowchart of a character offset detection method according to the embodiments of the present disclosure.

FIG. 1 is a flowchart of a character offset detection method according to the embodiments of the present disclosure. As shown in FIG. 1, the present disclosure discloses a character offset detection method. The method includes the following:

Step S1: a text image is acquired;

Step S2: character separation is performed based on the text image to obtain a character text region;

Step S3: a center point of each rectangular box in the character text region is calculated to obtain a center point set;

Step S4: an optimal fitted curve is determined based on the center point set; and Step S5: character offset is analyzed based on the optimal fitted curve to obtain an offset result.

All the steps are analyzed in detail below.

The step S2 that character separation is performed based on the text image to obtain a character text region specifically includes:

Step S21: the text image is preprocessed to obtain a plurality of stable regions, wherein the stable regions satisfy a certain set range;

Step S22: an external rectangular box is used to mark the plurality of stable regions to obtain a mark set, wherein the mark set includes a plurality of marked rectangular boxes; and Step S23: each rectangular box in the mark set is filtered to obtain a character text region.

The step S21 that the text image is preprocessed to obtain a plurality of stable regions specifically includes:

Step S211: the text image is separated and transformed to obtain a gray image;

Step S212: a partial histogram equalization algorithm is used to perform contrast enhancement on the gray image to obtain an enhanced image;

Step S213: the enhanced image is subjected to binaryzation to obtain a binary image; and Step S214: a plurality of stable regions are determined according to the binary image.

The step S23 that each rectangular box in the mark set is filtered to obtain a character text region specifically includes:

Step S231: a rectangular box area and a rectangular box overlapping area which correspond to each rectangular box in the mark set are calculated;

Step S232: overlapping ratios are determined according to the rectangular box areas and the rectangular box overlapping areas, wherein a specific formula is:

$$R_i = \frac{S_{ij}}{S_i}$$

where $R_i$ is the overlapping ratio; $S_{ij}$ is the rectangular box overlapping area; and $S_i$ is the rectangular box area;

Step S233: rectangular boxes with the maximum rectangular box overlapping areas and rectangular boxes with the overlapping ratios less than a first set threshold are selected as a text set to be processed, wherein the first set threshold is set according to an actual need;

Step S234: an area mean of the rectangular boxes is calculated based on the text set to be processed; and Step S235: rectangular boxes smaller than 0.2 times of the area mean and rectangular boxes larger than 5 times of the area mean are filtered out to obtain a character text region.

The step S4 that an optimal fitted curve is determined based on the center point set specifically includes:

Step S41: a start point, an end point and a certain intermediate point are selected from the center point set;

Step S42: the start point is connected to the end point to obtain a first straight line, and the start point is connected to the certain intermediate point to obtain a second straight line;

Step S43: an included angle cosine between the first straight line and the second straight line is determined, wherein a specific formula is:

$$\cos \alpha = \frac{\overrightarrow{P_1P_n} * \overrightarrow{P_1P_m}}{|P_1P_n| * |P_1P_m|}$$

where $\cos \alpha$ is the included angle cosine; $P_1$ is the start point; $P_n$ is the end point; $P_m$ is the certain intermediate point; $\overrightarrow{P_1P_n}$ is the first straight line; $\overrightarrow{P_1P_m}$ is the second straight line;

Step S44: an optimal fitted curve is searched based on the included angle cosine, specifically including:

Step S441: whether the included angle cosine is greater than an angle threshold is determined; it is indicated that the position of a certain character has deviated relative to the whole text region if the included angle cosine is greater than the angle threshold, and "step S442" is performed; and an initial fitted curve is taken as the optimal fitted curve if the included angle cosine is less than or equal to the angle threshold; the angle threshold is $$\frac{\pi}{6}.$$

Step S442: the initial fitted curve is acquired, wherein a specific formula is:

$$h(x_i) = wx_i + b$$

where $h(x_i)$ is the initial fitted curve of an ith center point; w is the slope; b is an offset amount; $x_i$ is an x-coordinate of the ith center point;

Step S443: a loss function value is determined based on the initial fitted curve, wherein a specific formula is:

$$loss = \Sigma(y_i - h_i(x_i))^2$$

where $h(x_i)$ is the initial fitted curve of the ith center point, and $(x_i, y_i)$ refers to an x-coordinate and a y-coordinate of the ith center point in the center point set;

Step S444: whether the loss function value is less than a set value is determined; the initial fitted curve is taken as the optimal fitted curve if the loss function value is less than the set value; and the slope and the offset amount in the initial fitted curve are updated if the loss function value is greater than or equal to the set value, the updated fitted curve is taken as the initial fitted curve, and "step S443" is performed;

Step S45: distances respectively from the start point, the end point, and the certain intermediate point to the optimal fitted curve are calculated, and a point corresponding to a maximum distance value is selected as a singular point.

The step S5 that character offset is analyzed based on the optimal fitted curve to obtain an offset result specifically includes:

Step S51: character vertical-offset analysis is performed based on the optimal fitted curve;

Step S52: character horizontal-offset analysis is performed based on the optimal fitted curve; and Step S53: character size offset analysis is performed based on the optimal fitted curve.

The step S51 that character vertical-offset analysis is performed based on the optimal fitted curve specifically includes:

Step S511: a distance from each center point in the center point set to the optimal fitted curve is calculated to obtain a first distance;

Step S512: a ratio of the first distance to the height of the rectangular box is calculated to obtain a first result; and Step S513: it is indicated that a character corresponding to the center point has deviated from the optimal fitted curve in a vertical direction if the first result is greater than a second set threshold.

The step S52 that character horizontal-offset analysis is performed based on the optimal fitted curve specifically includes:

Step S521: a vertical line is respectively made from each center point in the center point set to the optimal fitted curve to obtain a plurality of projection points;

Step S522: a distance between the start projection point and the end projection point is determined to obtain a second distance;

Step S523: a predicted distance between two adjacent projection points is determined according to the second distance, wherein a specific formula is:

$$L_{ave1} = \frac{L_p}{n-1}$$

where $L_{ave1}$ is the predicted distance; $L_P$ is the second distance; n is the total number of the projection points;

Step S524: an actual distance $\Delta x_i$, i=1, 2, . . . , n−1, between two adjacent projection points is determined; and Step S525: a ratio of the actual distance to the predicted distance is calculated to obtain a second result, wherein the more the second result deviates from 1, the greater the offset probability of the character corresponding to the center point from the optimal fitted curve in the horizontal direction is.

The step S53 that character size offset analysis is performed based on the optimal fitted curve specifically includes:

Step S531: an area of each rectangular box in the character text region is calculated, and a maximum area and a minimum area are selected; and Step S532: the maximum area $S_{kmax}$ is proportioned to the minimum area $S_{kmin}$ to obtain a third result; it is indicated that a style difference in character size exists if the third result is greater than or equal to 1.5; and it is indicated that no style difference in character size exists if the third result is less than 1.5.

Figure 2:
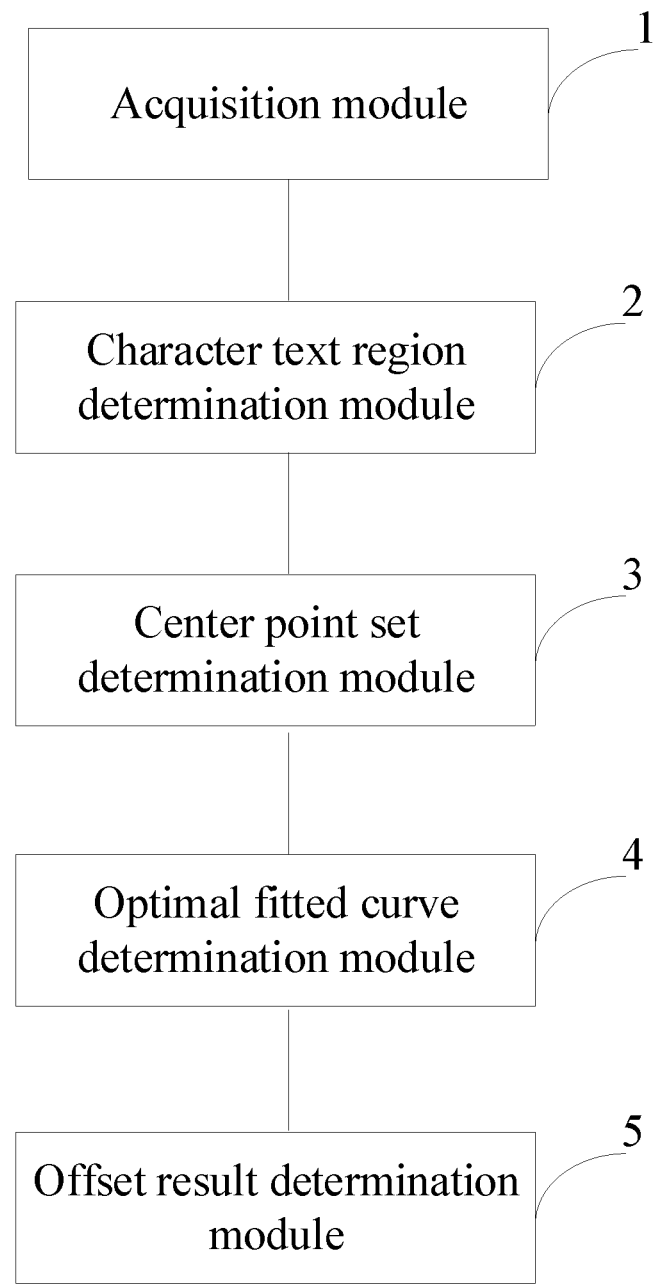
FIG. 2 is a structural diagram of a character offset detection system according to the embodiments of the present disclosure.

FIG. 2 is a structural diagram of a character offset detection system according to the embodiments of the present disclosure. As shown in FIG. 2, the present disclosure further discloses a character offset detection system. The system includes:

an acquisition module 1, configured to acquire a text image;

a character text region determination module 2, configured to perform character separation based on the text image to obtain a character text region;

a center point set determination module 3, configured to calculate a center point of each rectangular box in the character text region to obtain a center point set;

an optimal fitted curve determination module 4, configured to determine an optimal fitted curve based on the center point set; and an offset result determination module 5, configured to analyze character offset based on the optimal fitted curve to obtain an offset result.

All the modules are explained in detail below.

As one implementation mode, the character text region determination module 2 of the present disclosure specifically includes:

a preprocessing unit, configured to preprocess the text image to obtain a plurality of stable regions, wherein the stable regions satisfy a certain set range;

a marking processing unit, configured to use an external rectangular box to mark the plurality of stable regions to obtain a mark set, wherein the mark set includes a plurality of marked rectangular boxes; and a filtering processing unit, configured to filter each rectangular box in the mark set to obtain a character text region.

As one implementation mode, the preprocessing unit of the present disclosure specifically includes:

a separation and transformation sub-unit, configured to separate and transform the text image to obtain a gray image;

a contrast enhancement processing sub-unit, configured to use a partial histogram equalization algorithm to perform contrast enhancement on the gray image to obtain an enhanced image;

a binaryzation processing sub-unit, configured to perform binaryzation on the enhanced image to obtain a binary image; and a stable region determination sub-unit, configured to determine a plurality of stable regions according to the binary image.

As one implementation mode, the filtering processing unit of the present disclosure specifically includes:

an area determination sub-unit, configured to calculate a rectangular box area and a rectangular box overlapping area which correspond to each rectangular box in the mark set;

an overlapping ratio determination sub-unit, configured to determine overlapping ratios according to the rectangular box areas and the rectangular box overlapping areas;

a text set to be processed determination sub-unit, configured to select rectangular boxes with the maximum rectangular box overlapping areas and rectangular boxes with the overlapping ratios less than a first set threshold as a text set to be processed;

an area mean determination sub-unit, configured to calculate an area mean of the rectangular boxes based on the text set to be processed; and a filtering sub-unit, configured to filter out rectangular boxes smaller than 0.2 times of the area mean and rectangular boxes larger than 5 times of the area mean to obtain a character text region.

As one implementation mode, the optimal fitted curve determination module of the present disclosure specifically includes:

a selection unit, configured to select a start point, an end point and a certain intermediate point from the center point set;

a straight line determination unit, configured to connect the start point to the end point to obtain a first straight line, and connect the start point to the certain intermediate point to obtain a second straight line;

an included angle cosine determination unit, configured to determine an included angle cosine between the first straight line and the second straight line; and an optimal fitted curve determination unit, configured to search an optimal fitted curve based on the included angle cosine.

As one implementation mode, the optimal fitted curve determination unit of the present disclosure specifically includes:

a first determining sub-unit, configured to determine whether the included angle cosine is greater than an angle threshold; indicate that the position of a certain character has deviated relative to the whole text region if the included angle cosine is greater than the angle threshold, and perform an "acquisition sub-unit"; and take an initial fitted curve as the optimal fitted curve if the included angle cosine is less than or equal to the angle threshold;

an acquisition sub-unit, configured to acquire the initial fitted curve;

a loss function value determination sub-unit, configured to determine a loss function value based on the initial fitted curve; and a second determining sub-unit, configured to determine whether the loss function value is less than a set value; take the initial fitted curve as the optimal fitted curve if the loss function value is less than the set value; and update the slope and the offset amount in the initial fitted curve if the loss function value is greater than or equal to the set value, take the updated fitted curve as the initial fitted curve, and perform the "loss function value determination sub-unit".

As one implementation mode, the offset result determination module 5 of the present disclosure specifically includes:

a character vertical-offset analysis unit, configured to perform character vertical-offset analysis based on the optimal fitted curve;

a character horizontal-offset analysis unit, configured to perform character horizontal-offset analysis based on the optimal fitted curve; and a character size offset analysis unit, configured to perform character size offset analysis based on the optimal fitted curve.

As one implementation mode, the character vertical-offset analysis unit of the present disclosure specifically includes:

a first distance determination sub-unit, configured to calculate a distance from each center point in the center point set to the optimal fitted curve to obtain a first distance;

a first result determination sub-unit, configured to calculate a ratio of the first distance to the height of the rectangular box to obtain a first result; and a first offset analysis sub-unit, configured to indicate that a character corresponding to the center point has deviated from the optimal fitted curve in a vertical direction if the first result is greater than a second set threshold.

As one implementation mode, the character horizontal-offset analysis unit of the present disclosure specifically includes:

a projection point determination sub-unit, configured to respectively make a vertical line from each center point in the center point set to the optimal fitted curve to obtain a plurality of projection points;

a second distance determination sub-unit, configured to determine a distance between the start projection point and the end projection point to obtain a second distance;

a predicted distance determination sub-unit, configured to determine a predicted distance between two adjacent projection points according to the second distance;

an actual distance determination sub-unit, configured to determine an actual distance between two adjacent projection points; and a second offset analysis sub-unit, configured to calculate a ratio of the actual distance to the predicted distance to obtain a second result, wherein the more the second result deviates from 1, the greater the offset probability of the character corresponding to the center point from the optimal fitted curve in the horizontal direction is.

As one implementation mode, the character size offset analysis unit of the present disclosure specifically includes:

a selection sub-unit, configured to calculate an area of each rectangular box in the character text region, and select a maximum area and a minimum area; and a third offset analysis sub-unit, configured to proportion the maximum area to the minimum area to obtain a third result; indicate that a style difference in character size exists if the third result is greater than or equal to 1.5; and indicate that no style difference in character size exists if the third result is less than 1.5.

All the embodiments in the specification are described in a progressive manner. Contents mainly described in each embodiment are different from those described in other embodiments. Same or similar parts of all the embodiments refer to each other.

The principle and implementation modes of the present disclosure are described by applying specific examples herein. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of the specification shall not be deemed as limitations to the present disclosure.

What is claimed is:

1. A character offset detection method executable by at least one processing unit, the method comprising:

acquiring a text image of a seal image of a form using a text image acquisition module;

performing character separation based on the text image to obtain a character text region using a character text region determination module;

calculating a center point of each rectangular box in the character text region to obtain a center point set using a center point set determination module;

determining an optimal fitted curve based on the center point set using an optimal fitted curve determination module;

analyzing a character offset based on the optimal fitted curve to obtain an offset result using an offset result determination module; and authenticating the seal image of the form based on the offset result.

2. The character offset detection method according to claim 1, wherein the step of determining the optimal fitted curve based on the center point set comprises:

selecting a start point, an end point, and a certain intermediate point from the center point set;

connecting the start point to the end point to obtain a first straight line, and connecting the start point to the certain intermediate point to obtain a second straight line;

determining an included angle cosine between the first straight line and the second straight line; and searching the optimal fitted curve based on the included angle cosine.

3. The character offset detection method according to claim 2, wherein the step of searching the optimal fitted curve based on the included angle cosine comprises:

determining whether the included angle cosine is greater than an angle threshold; indicating that a position of a certain character has deviated relative to the whole text region if the included angle cosine is greater than the angle threshold, and proceeding to an acquiring step of acquiring the initial fitted curve; and taking the initial fitted curve as the optimal fitted curve if the included angle cosine is less than or equal to the angle threshold;

the acquiring step of acquiring the initial fitted curve;
a determining step of determining a loss function value based on the initial fitted curve; and
determining whether the loss function value is less than a set value; taking the initial fitted curve as the optimal fitted curve if the loss function value is less than the set value; and updating a slope and an offset amount in the initial fitted curve if the loss function value is greater than or equal to the set value, taking an updated fitted curve as the initial fitted curve, and proceeding to the determining step of determining the loss function value based on the initial fitted curve.

4. The character offset detection method according to claim 1, wherein the step of analyzing the character offset based on the optimal fitted curve specifically comprises:
performing a character vertical-offset analysis based on the optimal fitted curve;
performing a character horizontal-offset analysis based on the optimal fitted curve; and
performing a character size offset analysis based on the optimal fitted curve.

5. The character offset detection method according to claim 4, wherein the step of performing the character vertical-offset analysis based on the optimal fitted curve specifically comprises:
calculating a distance from each center point in the center point set to the optimal fitted curve to obtain a first distance;
calculating a ratio of the first distance to a height of the rectangular box to obtain a first result; and
indicating that a character corresponding to the center point has deviated from the optimal fitted curve in a vertical direction if the first result is greater than a second set threshold.

6. The character offset detection method according to claim 4, wherein the step of performing the character horizontal-offset analysis based on the optimal fitted curve specifically comprises:
respectively making a vertical line from each center point in the center point set to the optimal fitted curve to obtain a plurality of projection points;
determining a distance between a start projection point and an end projection point to obtain a second distance;
determining a predicted distance between two adjacent projection points according to the second distance;
determining an actual distance between two adjacent projection points; and
calculating a ratio of the actual distance to the predicted distance to obtain a second result, wherein the more the second result deviates from 1, the greater an offset probability of the character corresponding to the center point from the optimal fitted curve in a horizontal direction is.

7. The character offset detection method according to claim 4, wherein the step of performing the character size offset analysis based on the optimal fitted curve specifically comprises:
calculating an area of each rectangular box in the character text region, and selecting a maximum area and a minimum area; and
proportioning the maximum area to the minimum area to obtain a third result; indicating that a style difference in character size exists if the third result is greater than or equal to 1.5; indicating that no style difference in character size exists if the third result is less than 1.5; and calculating distances respectively from a start point, an end point, and a certain intermediate point to the optimal fitted curve, and selecting a point corresponding to a maximum distance value as a singular point.

8. A character offset detection system, the system comprising:
at least one processing unit; and
at least one memory having computer program instructions stored thereon and executable by the at least one processing unit to perform a method of:
acquiring a text image from a seal image of a form;
performing character separation based on the text image to obtain a character text region;
calculating a center point of each rectangular box in the character text region to obtain a center point set;
determining an optimal fitted curve based on the center point set;
analyzing a character offset based on the optimal fitted curve to obtain an offset result; and
authenticating the seal image of the form based on the offset result.

9. The character offset detection system according to claim 8, wherein the step of determining the optimal fitted curve based on the center point set comprises:
selecting a start point, an end point, and a certain intermediate point from the center point set;
connecting the start point to the end point to obtain a first straight line, and connecting the start point to the certain intermediate point to obtain a second straight line;
determining an included angle cosine between the first straight line and the second straight line; and
searching the optimal fitted curve based on the included angle cosine.

10. The character offset detection system according to claim 9, wherein the step of searching the optimal fitted curve based on the included angle cosine comprises:
determining whether the included angle cosine is greater than an angle threshold; indicating that a position of a certain character has deviated relative to the whole text region if the included angle cosine is greater than the angle threshold, and proceeding to an acquiring step of acquiring an initial fitted curve; and taking the initial fitted curve as the optimal fitted curve if the included angle cosine is less than or equal to the angle threshold;
the acquiring step of acquiring the initial fitted curve;
a determining step of determining a loss function value based on the initial fitted curve; and
determining whether the loss function value is less than a set value; taking the initial fitted curve as the optimal fitted curve if the loss function value is less than the set value; and updating a slope and an offset amount in the initial fitted curve if the loss function value is greater than or equal to the set value, taking an updated fitted curve as the initial fitted curve, and proceeding to the determining step of determining the loss function value based on the initial fitted curve.

11. An authenticating method performed by at least one processor executing computer program instructions stored in at least one memory, the method comprising:
acquiring a text image from the seal image of the form;
performing, by a character offset detection system comprising a processor and a memory, character offset detection on the text image, comprising:
performing character separation based on the text image to obtain a character text region;

calculating a center point of each rectangular box in the character text region to obtain a center point set;
determining an optimal fitted curve based on the center point set; and
analyzing a character offset based on the optimal fitted curve to obtain an offset result; and
authenticating the seal image of the form based on the offset result.

* * * * *